UNITED STATES PATENT OFFICE.

KARL BARRÉ LAMB, OF NEW YORK, N. Y., ASSIGNOR TO THE AMERICAN COTTON OIL COMPANY, A CORPORATION OF NEW JERSEY.

PIGMENT AND PIGMENT COMPOSITION, ETC.

1,424,729.  Specification of Letters Patent.  Patented Aug. 1, 1922.

No Drawing.  Application filed April 27, 1921. Serial No. 464,986.

*To all whom it may concern:*

Be it known that I, KARL B. LAMB, a citizen of the United States, residing at New York, in the county of New York, State of New York, have invented certain new and useful Improvements in Pigments and Pigment Compositions, Etc.; and I do hereby declare the following to be a full, clear, and exact description of the invention, such as will enable others skilled in the art to which it appertains to make and use the same.

This invention relates to improvements in pigments and pigment compositions. More particularly, the invention relates to composite pigments, and pigment compositions made therewith, which are adapted for use for many of the purposes where lamp black, and compositions containing lamp black, are now used.

Lamp black and gas black are commonly made by the incomplete combustion of natural gases and of hydrocarbons which, if not used for this purpose, would be available for other purposes. The importance of conserving the supply of natural gas, and the possible prevention of the use of natural gas in the manufacture of a gas black or carbon black, makes it of importance to supply a black pigment capable of replacing lamp black in many of its common uses.

The present invention relates to new and improved composite black pigments, which can be produced in a simple and advantageous manner from waste material, and which have properties that adapt them to particular advantage for use for many purposes.

Lamp black and similar carbon blacks, when used as black pigments, are lacking in body, and, when used as paint pigments, they are therefore used in conjunction with other pigments or fillers which serve to give body to the paint. When lamp black is used with white lead, a considerable amount of white lead can be used without destroying the essentially black color of the paint, although, if the amount of lead is too much, the paint will become a grayish color instead of black. With other white materials, such as are used as fillers in making paint, the amount which can be used without destroying the black color of the pigment is limited, and if a larger amount of the filler is used, the paint loses its black color and becomes grayish.

The composite pigments of the present invention combine, in a single composite material, both a filler or body-giving material and a black pigment, so intimately associated with each other that a relatively large amount of the filler or body-giving material is present without destroying the desired black properties.

The improved composite pigments of the present invention are made from spent fuller's earth (which is a by-product commonly considered to have little, if any, value, and frequently thrown away as worthless), by subjecting it to a regulated carbonizing operation for the production of carbon black from the oil with which the spent fuller's earth is admixed. In addition to the composite pigments, lamp black can be simultaneously produced and recovered from the "smoke" given off during the carbonizing operation, and this lamp black can either be admixed with the composite pigment, or recovered as a separate product.

Fuller's earth is commonly used in the refining and decolorizing of oils and fats, for example, vegetable oils and fats such as cottonseed oil. After a certain period of use, the fuller's earth loses its effectiveness and becomes what is commonly known as "spent." The spent fuller's earth, after the draining of as much as possible of the oil therefrom, still contains a considerable amount of oil admixed therewith, but it is commonly considered a waste product.

According to the present invention, the spent fuller's earth, still admixed with the oil which is not readily separable therefrom, is subjected to a regulated carbonizing operation in order to decompose the oil and form carbon black throughout the mass of fuller's earth.

The method of production of the new composite pigment will be further illustrated by the following specific example:

The spent fuller's earth, having the oil intimately distributed throughout its mass, was placed in an open pan and heated by direct flame, and the heating continued until the gases resulting from the decomposition of the oil caught fire. The heating of the earth was then discontinued or so regulated that the mass of earth and oil burned quietly. The burning should be carried out at as low a temperature as possible, and the mass should be stirred continually or from time to time throughout the operation. As the carbonization progressed, the earth became black in color until the product as a whole became an intense black. The further heating of the mass was then stopped, and the composite product permitted to cool, and was then ground in a ball mill until a sufficient degree of fineness for pigment purposes was obtained.

During the carbonizing operation a considerable amount of "smoke" is formed from the decomposition of the oil content of the spent fuller's earth, particularly if the burning, colorizing, and stirring operations are carried on at a low temperature, and with limited access of air. The finely divided carbon of this smoke appears to be precipitated in part throughout the fuller's earth, although a considerable amount of it escapes as smoke with the gaseous products of the carbonizing operation. This smoke can be treated for the precipitation and recovery of the carbon or lamp black therefrom, in much the same way that lamp black is recovered when made from oil. The lamp black thus separately recovered is itself a valuable product and can be separately used in place of lamp black made from other sources. It can also be advantageously combined with the composite black pigment formed by carbonizing the spent fuller's earth itself, thereby increasing the intensity of the black color of the composite pigment by adding a certain percentage of the separately collected lamp black thereto.

The decomposition and carbonization of the oil throughout the mass of the fuller's earth results in a most intimate production and deposition of the carbon black in and upon the particles of the earth, so that the product has an intense black color. The black color thus imparted to the earth may be considered to be due to three causes, namely, (1) to the actual formation of finely divided carbon from the oil within the body of the fuller's earth; (2) the precipitation of the oil smoke in a finely divided state within the mass of the fuller's earth; and (3) the incorporation of the lamp black separately precipitated from the smoke, when this separately produced lamp black is admixed with the original composite pigment. As a result of this intimate production and deposition of the carbon black in and upon the particles of the earth, even though but a small percentage of the total weight of the composite pigment is made of the carbon black, the whole product is nevertheless of an intense black color. The fuller's earth, which is itself of a porous structure, appears to be intimately coated or plated with the deposited black. As a result, the composite product, although of an intense black color, nevertheless has a relatively large amount of fuller's earth intimately combined therewith, so that the composite pigment can be used to particular advantage for purposes where a pigment having considerable body, as well as an intense black color, is desired.

The composite pigment can be ground in oil, for example, linseed oil, to form a paint, or can be used as such, or further compounded with other paint ingredients. The composite pigment is extremely finely divided in nature, somewhat resembling lamp-black in this regard, and paints made with it have good covering properties; while the fuller's earth of the composite pigment gives a desirable body to the paint in addition to its intense black color. The composite pigment can also be used in admixture with other black pigments, or in admixture with white pigments to give a paint of a gray color. That is, the composite black pigment of the present invention can be used either alone with a paint vehicle and drier, or in admixture with other black pigments or with other fillers, either in the production of jet black or gray paints. In general, the composite black pigment can be used in place of other black pigments, where a filler or increased body, in addition to a black color, is desired. For example, a mixed paint can be made by compounding about 60 parts of the composite pigment with about 40 parts of raw linseed oil containing a suitable amount of a drier incorporated therewith. The amount of the vehicle can of course be varied, as well as the nature of the vehicle, etc.

The composite pigment can also be used for other purposes where a black pigment or compounding or coloring material is desired, for example, as a constituent of printer's ink, or shoe polish, in substitution for part of the black pigment commonly used therein. In general, the new composite black pigment can be used for many of the purposes for which lamp black and similar carbon blacks are now used, and with the advantage that not only a black color, but a substantial body is provided by the composite product.

The new composite pigment can also be used to advantage for compounding with rubber, as a substitute for lamp black, in part or in whole; and it will impart to the rubber improved or modified properties owing to the composite character of the product.

It will thus be seen that the composite pigment of the present invention is of a characteristic composition and structure, and can be readily produced from spent fuller's earth by a simple and regulated heating operation, with heating and stirring of the earth until the earth catches fire and burns itself out, but with regulation of the heating and carbonizing operation to develop an intense black color. The composite product thus produced, although it contains but a relatively small proportion of the carbon black, nevertheless contains this carbon black so intimately distributed on and throughout the fuller's earth particles that the composite product, although made up for the most part of the fuller's earth as an ingredient, is nevertheless an intense black color, so that the composite pigment provides a relatively large amount of filler in conjunction with an intense black color. The composite pigment is, therefore, of particular advantage where a composite paint is desired having a considerable amount of filler, together with a black color.

The lamp black which is separated from the smoke given off during the carbonizing is available for use for the same purposes for which lamp black is commonly employed. It may be used alone, in place of lamp black, or it may be admixed with the composite pigment to increase its carbon content.

I do not claim specifically herein the paint compositions and the rubber compositions in which the new composite pigment is employed, inasmuch as these compositions form the subject matter of my applications, Serial Numbers 533,554 and 533,553, filed Feb. 2, 1922; while the claims in the present case are directed more generally to the new composite pigment and the method of its production.

I claim:

1. A composite pigment comprising spent fuller's earth having an intense black color imparted thereto by a heating and carbonizing operation.

2. A composite black pigment comprising fuller's earth having a relatively small percentage of carbon black intimately distributed throughout the mass of the fuller's earth, so that the composite product, as a whole, is of an intense black color.

3. The method of producing a composite black pigment which comprises subjecting fuller's earth to a regulated heating and carbonizing operation until an intense black color is developed.

4. The method of producing a composite black pigment which comprises heating spent fuller's earth with stirring until the oil of the earth catches fire and burns itself out with the production of an intense black color.

5. The method of producing a composite black pigment which comprises subjecting fuller's earth to a regulated heating and carbonizing operation until an intense black color is developed, and separately recovering carbon black from the smoke given off during the carbonizing operation.

In testimony whereof I affix my signature.

KARL BARRÉ LAMB.